US007010720B2

United States Patent
Maeda et al.

(10) Patent No.: US 7,010,720 B2
(45) Date of Patent: Mar. 7, 2006

(54) DATA RECEPTION SYSTEM CAPABLE OF REPLACING RECORDING MEDIUM

(75) Inventors: Kazuki Maeda, Neyagawa (JP); Hiroshi Yokota, Suita (JP); Tatsuro Ikoma, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 616 days.

(21) Appl. No.: 10/098,437

(22) Filed: Mar. 18, 2002

(65) Prior Publication Data

US 2002/0133741 A1 Sep. 19, 2002

(30) Foreign Application Priority Data

Mar. 19, 2001 (JP) ............................ 2001-077856

(51) Int. Cl.
*G06F 11/00* (2006.01)

(52) U.S. Cl. .................. 714/7; 714/5; 714/15; 714/18; 714/20; 714/42; 714/46; 714/6; 725/31; 725/29; 725/89; 725/100; 725/142; 725/134; 725/92; 705/51; 705/57

(58) Field of Classification Search .................... 714/7, 714/5, 15, 18, 20, 42, 46, 6; 725/89, 100, 725/142, 134, 92
See application file for complete search history.

(56) References Cited

U.S. PATENT DOCUMENTS

| | | | | |
|---|---|---|---|---|
| 6,052,764 | A * | 4/2000 | Mogul | 711/162 |
| 6,163,859 | A * | 12/2000 | Lee et al. | 714/38 |
| 6,598,174 | B1 * | 7/2003 | Parks et al. | 714/6 |
| 2001/0042043 | A1 * | 11/2001 | Shear et al. | 705/51 |
| 2002/0152416 | A1 * | 10/2002 | Fukuda | 714/7 |
| 2003/0172317 | A1 * | 9/2003 | Tsunoda et al. | 714/7 |

FOREIGN PATENT DOCUMENTS

JP 2000-278618 10/2000

* cited by examiner

*Primary Examiner*—Nadeem Iqbal
*Assistant Examiner*—Timothy M. Bonura
(74) *Attorney, Agent, or Firm*—Wenderoth, Lind & Ponack, L.L.P.

(57) ABSTRACT

A reception apparatus records a content distributed from a content distribution apparatus on a hard disk. Following an instruction from a viewer, the reception apparatus reproduces the content. The reception apparatus transmits management information including identification information about the content recorded on the hard disk to a management apparatus. The management apparatus stores the information in a management information storage. When the hard disk of the reception apparatus fails, a replacement hard disk is attached to the management apparatus. The management apparatus retrieves, based on the stored management information, the same content as the content recorded on the hard disk of the reception apparatus from a content distribution apparatus, etc., and records the retrieved content on the replacement hard disk. The hard disk of the reception apparatus is then replaced with the replacement hard disk with the content recorded thereon.

8 Claims, 8 Drawing Sheets

F I G. 1
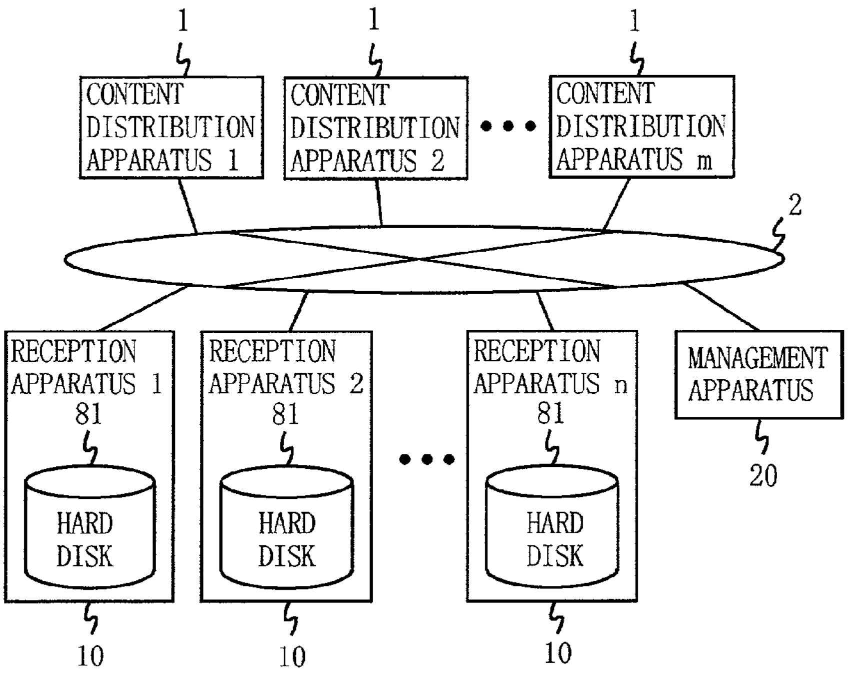
F I G. 2
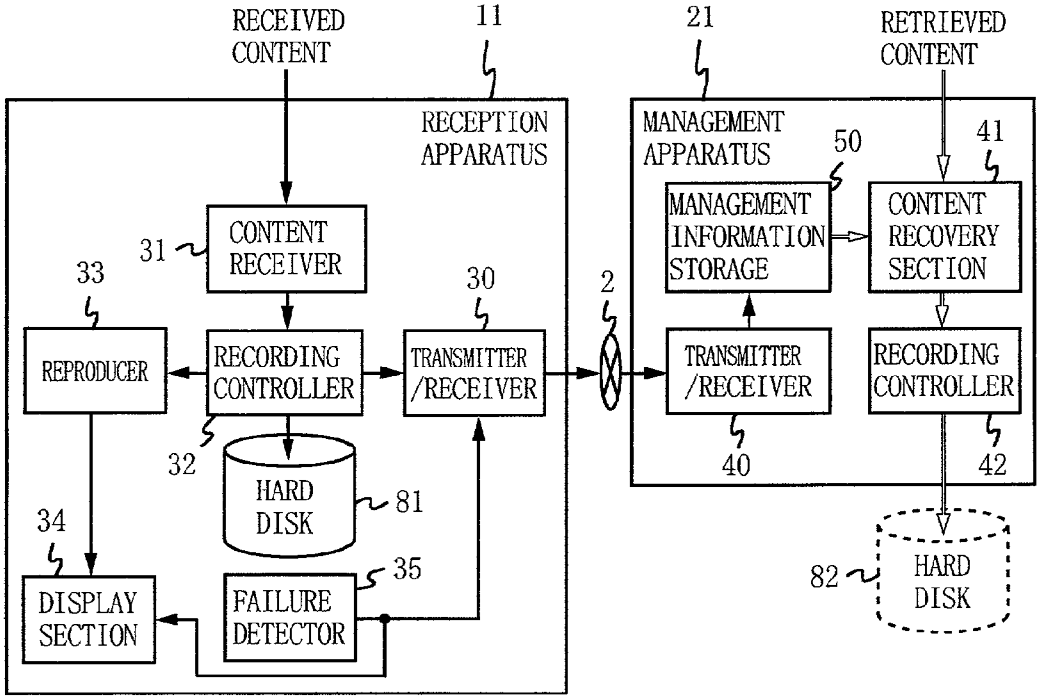

F I G. 3
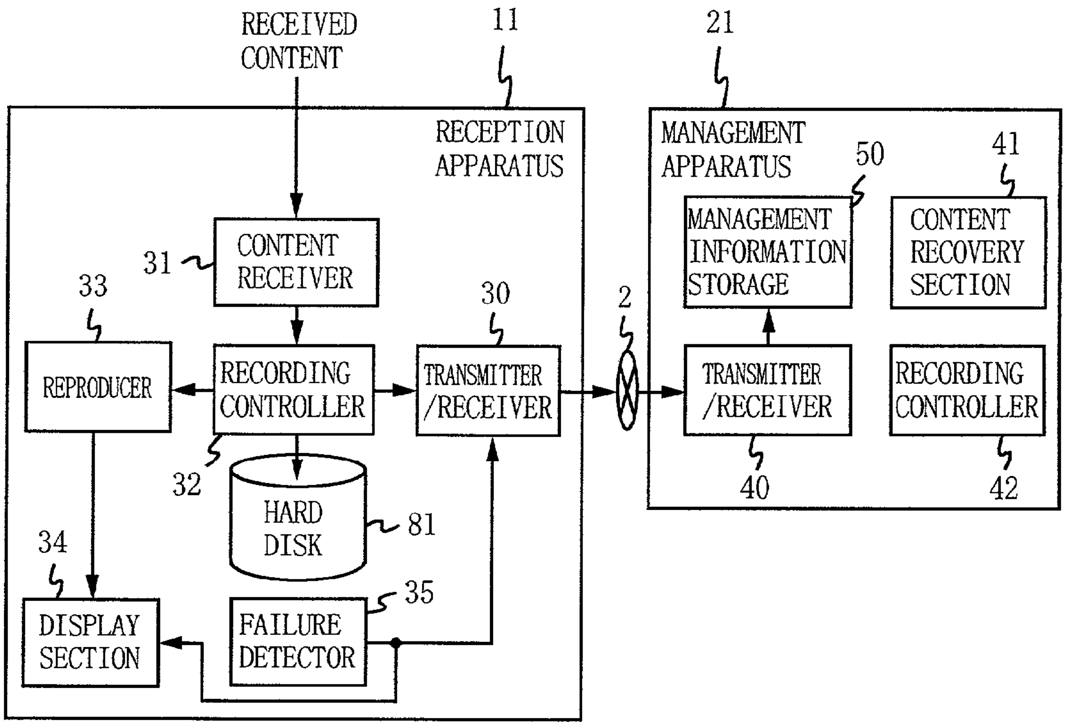
F I G. 4
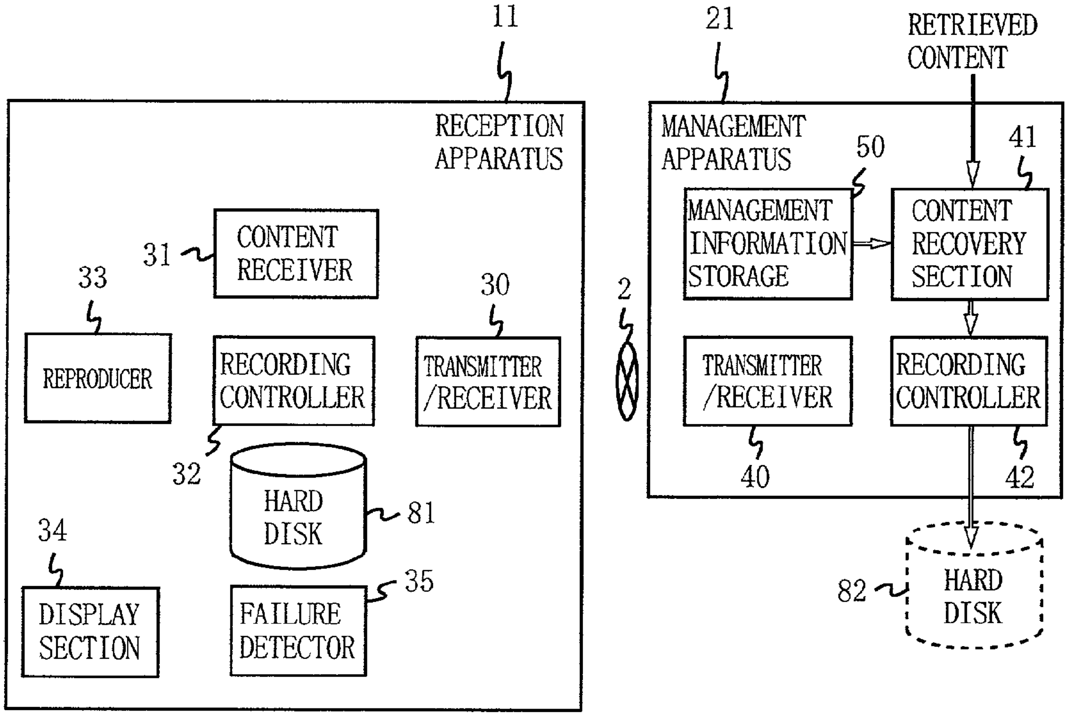

F I G. 5

51

| RECEPTION APPARATUS (61) | POSSESSED CONTENT (62) | USE CONDITION: REMAINING NUMBER OF USE TIMES YOU CAN USE (63) | USE CONDITION: EXPIRATION DATE (64) |
|---|---|---|---|
| RECEPTION APPARATUS R1 | MOVIE F1 | ∞ | NO TIME LIMIT |
| RECEPTION APPARATUS R1 | MOVIE F2 | 2 | NO TIME LIMIT |
| RECEPTION APPARATUS R1 | MOVIE F3 | ∞ | 31/3/2002 |
| RECEPTION APPARATUS R1 | MUSIC M1 | 10 | NO TIME LIMIT |
| RECEPTION APPARATUS R1 | MUSIC M2 | ∞ | NO TIME LIMIT |
| ⋮ | ⋮ | ⋮ | ⋮ |
| RECEPTION APPARATUS R2 | MOVIE F2 | 1 | NO TIME LIMIT |
| RECEPTION APPARATUS R2 | MOVIE F4 | 5 | 31/12/2002 |
| ⋮ | ⋮ | ⋮ | ⋮ |

F I G. 6 A

| CONTENT NAME | CONTENT DISTRIBUTION APPARATUS |
|---|---|
| MOVIE F1 | DISTRIBUTION APPARATUS S1 |
| MOVIE F2 | DISTRIBUTION APPARATUS S1 |
| MOVIE F3 | DISTRIBUTION APPARATUS S2 |
| MOVIE F4 | DISTRIBUTION APPARATUS S1 |
| ⋮ | ⋮ |
| MUSIC M1 | DISTRIBUTION APPARATUS S7 |
| MUSIC M2 | DISTRIBUTION APPARATUS S8 |
| ⋮ | ⋮ |

F I G. 6 B

| CONTENT NAME | RECEPTION APPARATUS |
|---|---|
| MOVIE F1 | RECEPTION APPARATUS R1 |
| MOVIE F2 | RECEPTION APPARATUS R1, R2 |
| MOVIE F3 | RECEPTION APPARATUS R1 |
| MOVIE F4 | RECEPTION APPARATUS R2 |
| ⋮ | ⋮ |
| MUSIC M1 | RECEPTION APPARATUS R1 |
| MUSIC M2 | RECEPTION APPARATUS R1 |
| ⋮ | ⋮ |

F I G. 7
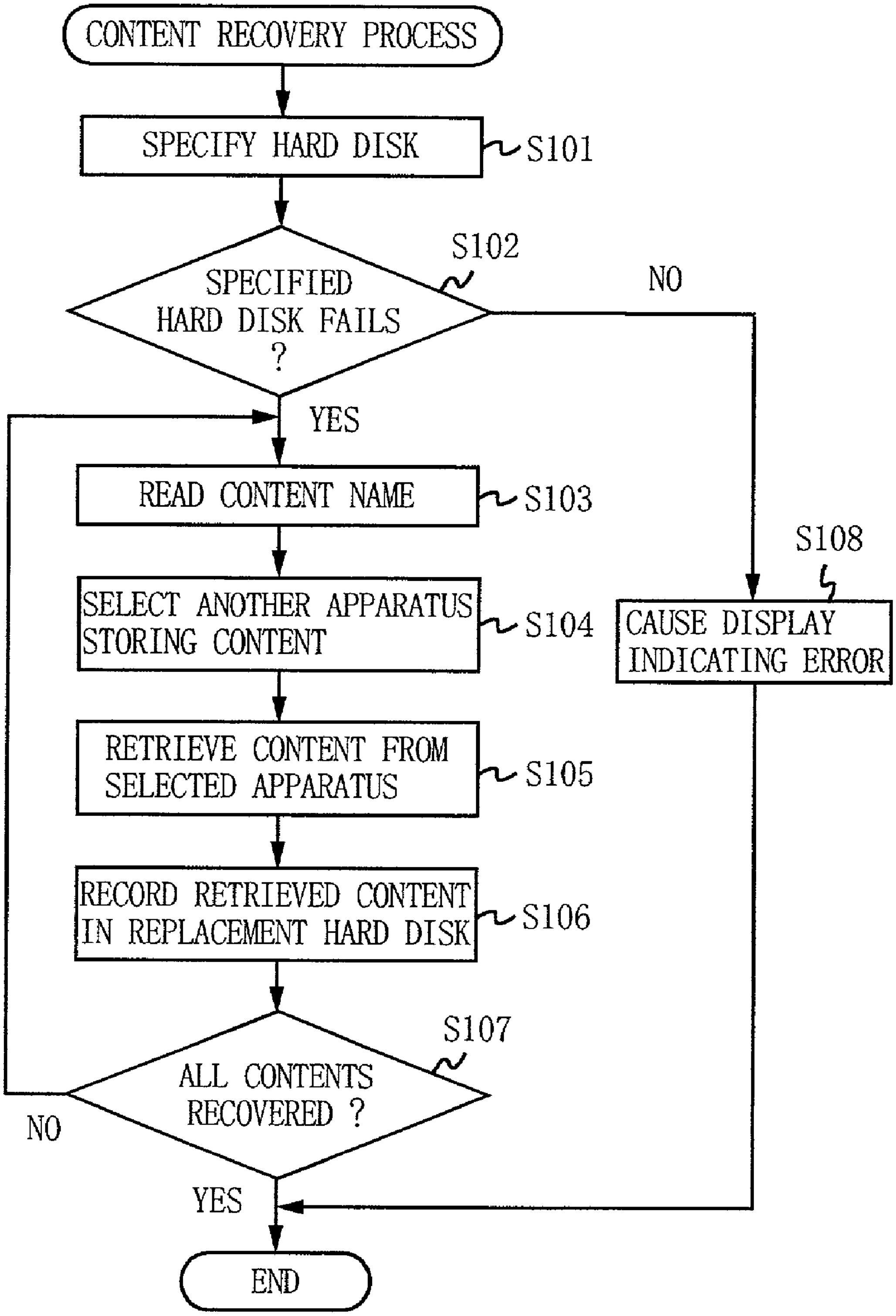

F I G. 8
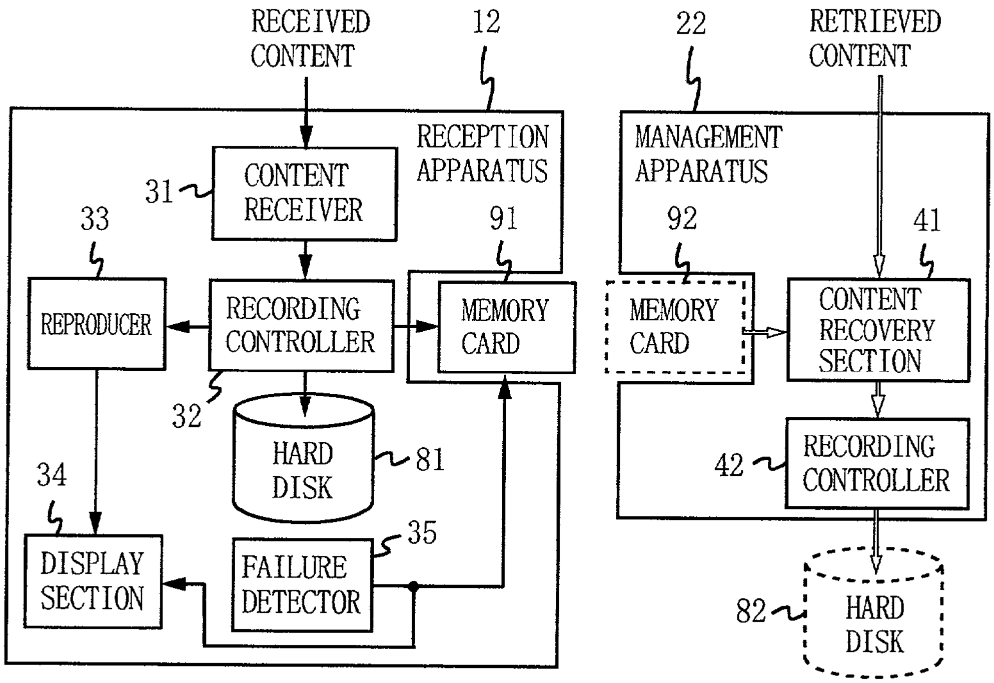
F I G. 9
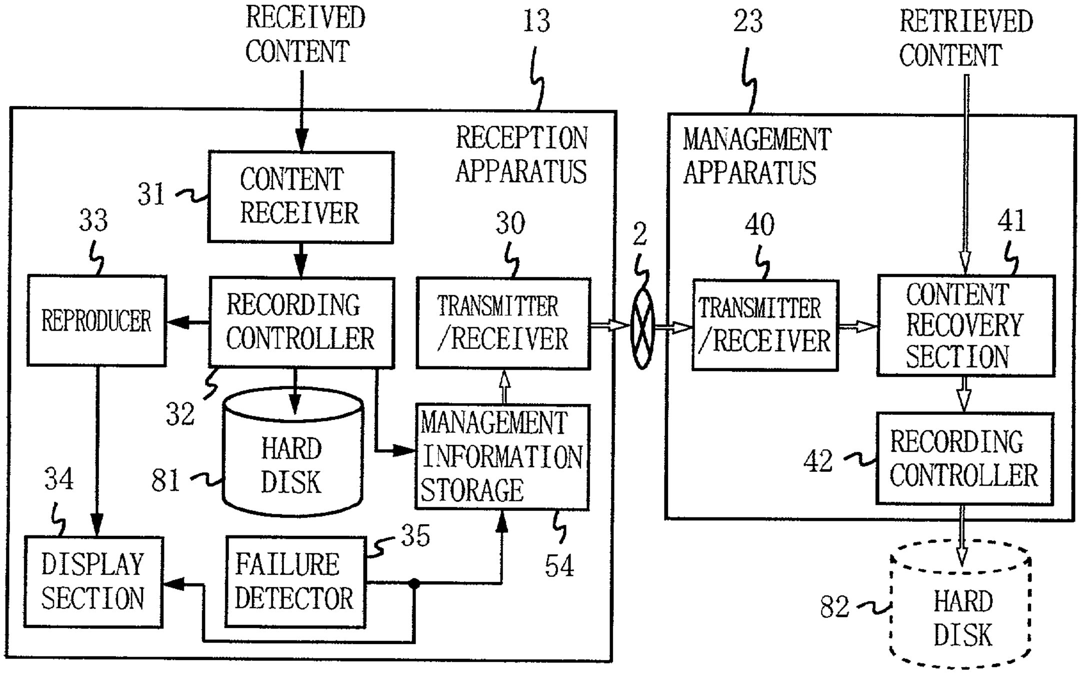

F I G. 1 0
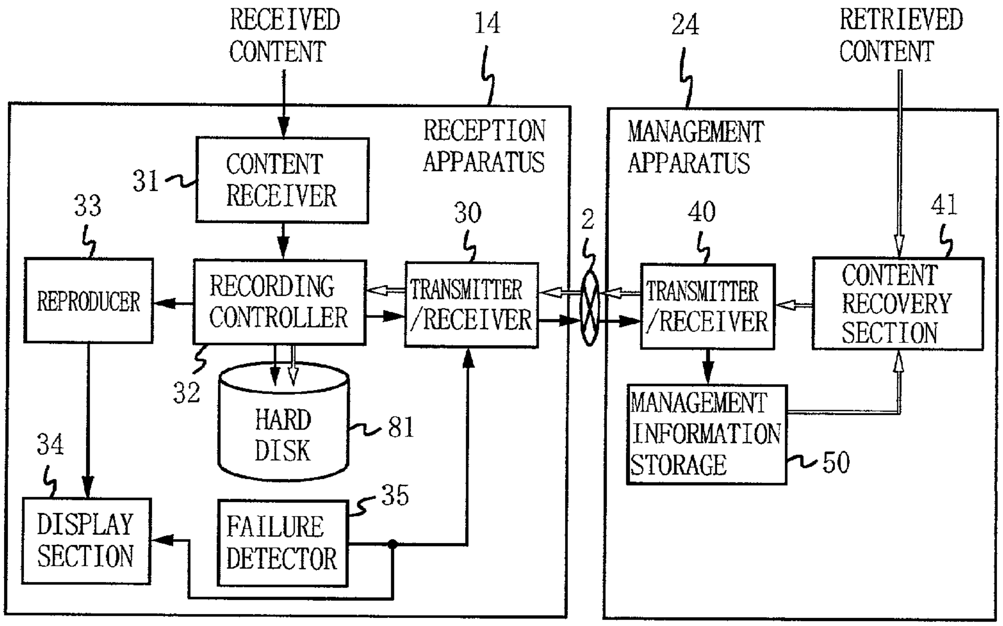
F I G. 1 1
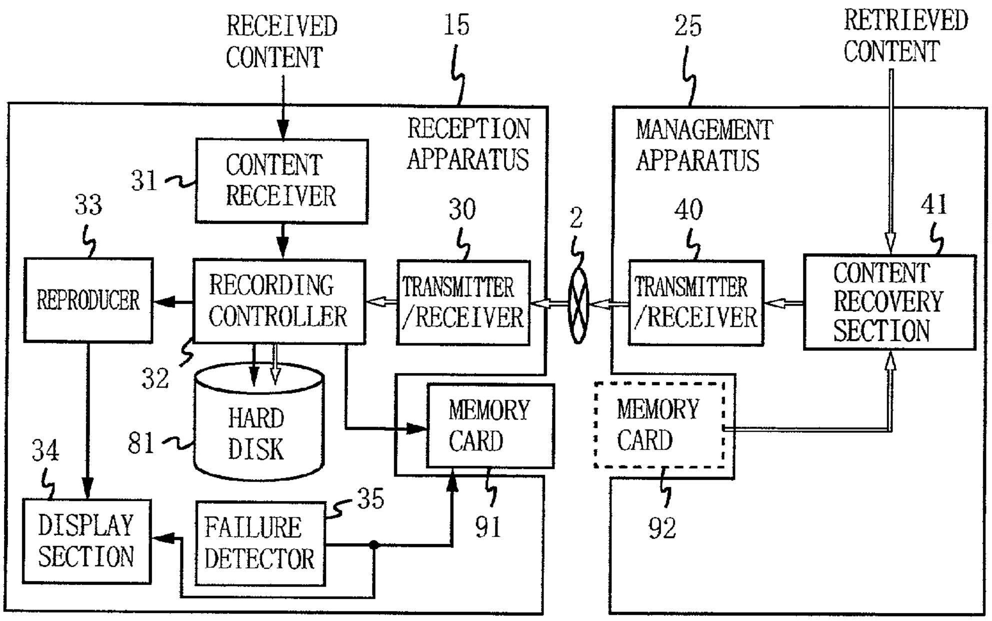

DATA RECEPTION SYSTEM CAPABLE OF REPLACING RECORDING MEDIUM

BACKGROUND OF THE INVENTION

1. Field of the Invention

The present invention relates to data reception systems for storing and reproducing received data and, more specifically, to a data reception system which is capable of replacing a faulty recording medium having data recorded thereon for data recovery.

2. Description of the Background Art

Computers use a recording medium, such as a hard disk, to store a large amount data. Such a recording medium may, however, fail often. When the hard disk fails, the hard-disk manufacturing and sales company generally guarantees to provide an alternative hard disk, but does not guarantee to recover lost data. For example, hard disks manufactured by Seagate Technology Inc. (marketed by Kabushiki Kaisha Synnex in Japan) bear warranty guaranteeing to replace for free the hard disk that fails during a two-year warranty period, but not guaranteeing to recover the data that is recorded on the faulty hard disk.

Meanwhile, with an increase in the capacity of hard disks, storage-type video distribution services using such hard disks have been suggested, and a specific example thereof is disclosed in Japanese Patent Laid-Open Publication No. 2000-278618. In this service, video data with a certain limitation is distributed from a server to a receiver. The distributed video data is recorded on a hard disk which is incorporated in the receiver. A viewer views video within that limitation. Some video data can be possessed for an indefinite period of time, such as data that is recorded on a video tape or a DVD (Digital Versatile Disk). Some video data has a limitation on the number of it can be viewed times or the viewable period. In a storage-type video distribution service, the more the hard disk has video data recorded thereon, the more valuable the hard disk becomes.

As stated above, however, hard disks fail due to various reasons. If a hard disk with a large amount of video data recorded thereon fails, what matters is the recorded data, rather than the hard disk itself. Therefore, in this case, data recovery is more desired than hard disk replacement.

Also, hard disks have increased in capacity so rapidly that hard disks having a capacity of over several Tbytes (terabytes) are expected to come along in several years. Such hard disk can have video data of several hundred hours recorded thereon. Therefore, to viewers who enjoy the storage-type video distribution service, managing and backing-up such a large amount of data on their own will be quite burdensome to the viewers. If the large-capacity hard disk having a large amount of data recorded thereon fails once, financial damage caused thereby will be enormous.

The above-described problems will occur not only when the hard disk fails but also when it is replaced with another hard disk. For example, consider a case where a viewer desires to buy a new receiver to replace the existing one. In this case, if video data that is stored in the hard disk of the existing receiver cannot be moved into the new one, the viewer is deemed to abandon the right of viewing the video data that is recorded on the original hard disk. Also, the increase in the hard disk capacity is so rapid that hard disks become obsolete earlier than ever before. Therefore, the hard disk may become obsolete earlier than the receiver that incorporates it. In this case, some viewers may replace the hard disk with a new one but still use the receiver. Replacing the hard disk is not a difficult task for viewers. Transferring data from an old hard disk to a new one is, however, not an easy task for every viewer because it requires some special apparatus and expert knowledge. Furthermore, removal of the hard disk from the receiver is sometimes restricted in view of ensuring the capability of the receiver.

One way to solve the above-described problems is copying the video data to various media such as video tapes. In practice, however, it is quite difficult to copy the entire data that is recorded on the hard disk having a large capacity such as several Tbytes. If copying is made, the viewer has to manage a large number of media with the copied data, which is quite burdensome.

SUMMARY OF THE INVENTION

Therefore, an object of the present invention is to provide a data reception system which is capable of replacing a faulty recording medium having data recorded thereon and easily recovering the data.

The present invention has the following features to attain the object described above.

A first aspect of the present invention is directed to a data reception system that includes a reception apparatus having a recording medium, and a management apparatus for managing the reception apparatus. The reception apparatus includes: a data receiver for receiving data from a data source; the recording medium for recording the data that is received by the data receiver; a recording controller for controlling access to the recording medium; and a management information output section for outputting management information including identification information about the data that is recorded on the recording medium. The management apparatus includes: a management information input unit operable to input the management information; and a data recovery section for recovering, when the recoding medium is replaced, the data that was recorded on the recording medium before being replaced as recovered data based on the management information that is received by the management information input unit. According to the first aspect, the reception apparatus outputs the management information including the identification information of the data that is recorded on the recording medium. The management apparatus recovers the data based on the received management information. Thus, when the recording medium of the reception apparatus fails, the faulty recording medium can be replaced, and the contents recorded thereon can be easily recovered.

In the first aspect, the management apparatus may be constructed so as to enable the recording medium to be removably attached thereto, and the management apparatus may further include a second recording controller for recording, when the recording medium is replaced, the recovered data on a replacement recording medium which is attached to the management apparatus. Thus, when the recording medium of the reception apparatus fails, the data that is recorded on the recording medium before being replaced is recorded on the replacement recording medium which is placed in the management apparatus. Therefore, by attaching the replacement recording medium to the reception apparatus, the user of the reception apparatus can use the data that is stored in the reception apparatus similarly as before the replacement of the recording medium.

In addition, the management apparatus may further include a recovered data transmission section for transmitting the recovered data, the reception apparatus may further include a recovered data receiver for receiving the recovered data, and the recording controller may record the data that is received by the recovered data receiver on a replacement disk when the recording medium is replaced. Thus, when the recording medium of the reception apparatus fails, the data that is recorded on the recording medium before being replaced is recorded on the replacement recording medium which is placed in the reception apparatus. Therefore, the user of the reception apparatus can use the data that is stored in the reception apparatus similarly as before the replacement of the recording device. Moreover, it is possible to recover the data that is recorded on the recording medium before being replaced without transporting the recording medium to the location of the management apparatus.

Furthermore, the management apparatus may be constructed so as to enable the recording medium to be removably attached thereto. The management apparatus may further include: a second recording controller for recording a program for receiving the recovered data on a replacement recording medium which is attached to the management apparatus when the recording medium is replaced; and a recovered data transmission section for transmitting the recovered data. The reception apparatus may further include a recovered data receiver for receiving the recovered data by reading the program from the replacement recording medium which is removed from the management apparatus and then attached to the reception apparatus and by using the read program, and the recording controller records the recovered data that is received by the recovered data receiver on the replacement recording medium when the recording medium is replaced. Thus, when the recording medium of the reception apparatus fails, the program for receiving the recovered data is recorded on the replacement recording medium which is placed in the management apparatus. The reception apparatus with this replacement recording medium attached thereto uses the recorded program for receiving the recovered data from the management apparatus. Therefore, it is possible to recover the data that was recorded on the recording medium before being replaced without recording a large amount of data on the replacement recording medium.

In addition, the management information output section may transmit the management information to the management apparatus. The management information input unit may receive the management information from the reception apparatus for storage, and, when the recording medium is replaced, may output the stored management information to the data recovery section. Thus, the management information which is required for data recovery does not have to be stored in each reception apparatus. In the management apparatus, the management information of each of the plurality of the reception apparatus can be collectively managed in the management apparatus. Accordingly, since the management apparatus collectively manages (i.e., with a common procedure) the management information of each reception apparatus, each reception apparatus is not required to manage its own management information. In this case, more preferably, the management information output section may transmit use limit information of the data that is recorded on the recording medium as being included in the management information to the management apparatus, and, when the data that is recorded on the recording medium is used, may transmit a use report about the data to the management apparatus. Also, the management information input unit may update the use limit information of the data that is included in the stored management information based on the use report which is received from the management information output section. Thus, each time the data stored in the reception apparatus is used, the management information that is stored in the management apparatus is updated. Therefore, when the recording medium was replaced, the user can use data stored in the reception apparatus by following the same use limit as that before replacement of the recording medium.

Furthermore, the reception apparatus and the management apparatus may be both constructed so as to enable a second recording medium which is different from the recording medium to be removably attached thereto. The management information output section may record the management information on the second recording medium which is attached to the reception apparatus. When the recording medium is replaced, the management information input unit may read the management information from the second recording medium which is removed from the reception apparatus and then attached to the management apparatus, and may output the read management information to the data recovery section. Thus, even the reception apparatus without any communications section can provide the management apparatus with the management information which is required for data recovery. In this case, more preferably, the management information output section may record, on the second recording medium, use limit information of the data that is recorded on the recording medium as being included in the management information, and, when the data that is recorded on the recording medium is used, may update the use limit information of the data that is recorded on the second recording medium. Thus, each time the data that is stored in the reception apparatus is used, the management information which is recorded on the second recording medium is updated. Therefore, when the recording medium was replaced, the user can use data that was stored in the reception apparatus by following the same use limit as that before replacement of the recording medium.

Moreover, the management information output section may itself store the management information, and, when the recording medium is replaced, the management information output section transmits the stored management information to the management apparatus. The management information input unit may receive, when the recording medium is replaced, the management information from the reception apparatus, and may output the received management information to the data recovery section. Thus, the management information which is required for data recovery is stored in the reception apparatus, and is transmitted when the recording medium is replaced. Therefore, the amount of communications of the management information can be reduced. In this case, more preferably, the management information output section may itself store use limit information of the data that is recorded on the recording medium as being included in the management information, and, when the data that is recorded on the recording medium is used, the management information output section may update the stored use limit information which is included in the management information. Thus, each time the data that is stored in the reception apparatus is used, the management information which is stored in the reception apparatus is updated. Therefore, when the recording medium was replaced, the user can use data that was stored in the reception apparatus by following the same use limit as that before replacement of the recording medium.

Furthermore, when the recording medium is replaced, the data recovery section may receive the data from the data source or a reception apparatus other than the reception apparatus where the recording medium is replaced, and may obtain the recovery data based on the received data. As such, the data recovery section receives the data from the outside (external source) when the recording medium is replaced. Therefore, the data recovery section can recover the data that was recorded on the recording medium before being replaced without storing data in itself. Especially, if the data recovery section receives the data from a reception apparatus other than the reception apparatus where the recording medium is replaced, it is possible to recover the data that was recorded on the recording medium before being replaced even if the data source no longer stores the data which was distributed before.

In addition, the management apparatus may further include a time-limited data receiver for receiving data that is distributed within a limited time period for storage. When the recording medium is replaced, the data recovery section may generate the recovery data based on the data that is stored in the time-limited data receiver. Thus, when the recording medium is replaced, the management apparatus can also recover the data distributed within a limited time period and recorded on the recording medium before being replaced.

Furthermore, the reception apparatus may further include a decision section for deciding whether or not the recording medium should be replaced based on the state of failure on the recording medium or an amount of remaining free space of the recording medium. Thus, whether or not the recording medium should be replaced is automatically determined based on the state of failure on the recording medium or the remaining free space of the recording medium. Therefore, it is possible to replace the recording medium and recover the data without missing appropriate timing. In this case, more preferably, the reception apparatus may further include a display section for displaying a decision result which is made by the decision section. Thus, it is possible to let the user recognize the failure on the recording medium or the space shortage, and immediately replace the recording medium for data recovery.

Also, in this case, the data recovery section may start to obtain the recovered data based on a decision result made by the decision section. Thus, it is possible to replace the recording medium and recover the data after confirming that the recording medium should be replaced. In this case, more preferably, after the decision section decides that the recording medium should be replaced, the recording controller may receive the recovery data from the management apparatus instead of making access to the recording medium until replacement of the recording medium is completed. Thus, even if the data that was recorded on the recording medium cannot be used because the recording medium fails, for example, the user can receive alternative data from the management apparatus for use.

Moreover, the data that is recorded on the recording medium may be encrypted by an encryption key which is unique to the reception apparatus. Also, after a predetermined time elapses from the time of recovery, the recovered data can be used only when a condition for returning the recording medium is satisfied. In addition, the recording medium may be constructed so as to have the recorded data deleted when the recording medium is removed from the reception apparatus. Thus, unauthorized use of the data that is recorded on the recording medium can be prevented.

Furthermore, the reception apparatus and the management apparatus may be connected via the Internet to each other. Thus, data transmission/reception between the reception apparatus and the management apparatus can be made immediately as required. Moreover, such data transmission/reception can be made without requiring any dedicated communications network or dedicated communications procedure.

A second aspect of the present invention is directed to data reception method using a reception apparatus having a recording medium, and a management apparatus for managing the reception apparatus. The reception apparatus executes: a step of receiving data to be recorded on the recording medium from a data source; a step of controlling access to the recording medium; and a step of outputting management information including identification information about the data that is recorded on the recording medium. The management apparatus executes: a step of receiving the management information; and a step of recovering, when the recoding medium is replaced, the data that is recorded on the recording medium before being replaced as recovered data based on the management information which is received in the management information receiving step. According to the second aspect, the reception apparatus outputs the management information including the identification information of the data that is recorded on the recording medium. The management apparatus recovers the data based on the received management information. Thus, when the recording medium of the reception apparatus fails, the faulty recording medium can be replaced, and the contents recorded thereon can be easily recovered.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustration showing the construction of a content distribution system including a content reception system according to first to sixth embodiments of the present invention;

FIG. 2 is a block diagram showing the construction of a content distribution system according to the first embodiment of the present invention;

FIG. 3 is an illustration for demonstrating the normal operation which is carried out by the content reception system according to the first embodiment of the present invention;

FIG. 4 is an illustration for demonstrating the operation of replacing a hard disk in the content reception system according to the first embodiment of the present invention;

FIG. 5 is an illustration showing one example of management information in the content reception system according to the first to sixth embodiments of the present invention;

FIGS. 6A and 6B are illustrations showing other examples of the management information in the content reception system according to the first to sixth embodiments of the present invention;

FIG. 7 is a flowchart showing the operation which is carried out by a content recovery section of the content reception system according to the first to sixth embodiments of the present invention;

FIG. 8 is a block diagram showing the construction of the content reception system according to the second embodiment of the present invention;

FIG. 9 is a block diagram showing the construction of the content reception system according to the third embodiment of the present invention;

FIG. 10 is a block diagram showing the construction of the content reception system according to the fourth embodiment of the present invention;

FIG. 11 is a block diagram showing the construction of the content reception system according to the fifth embodiment of the present invention.

DESCRIPTION OF THE PREFERRED EMBODIMENTS

First Embodiment

Figure 12:
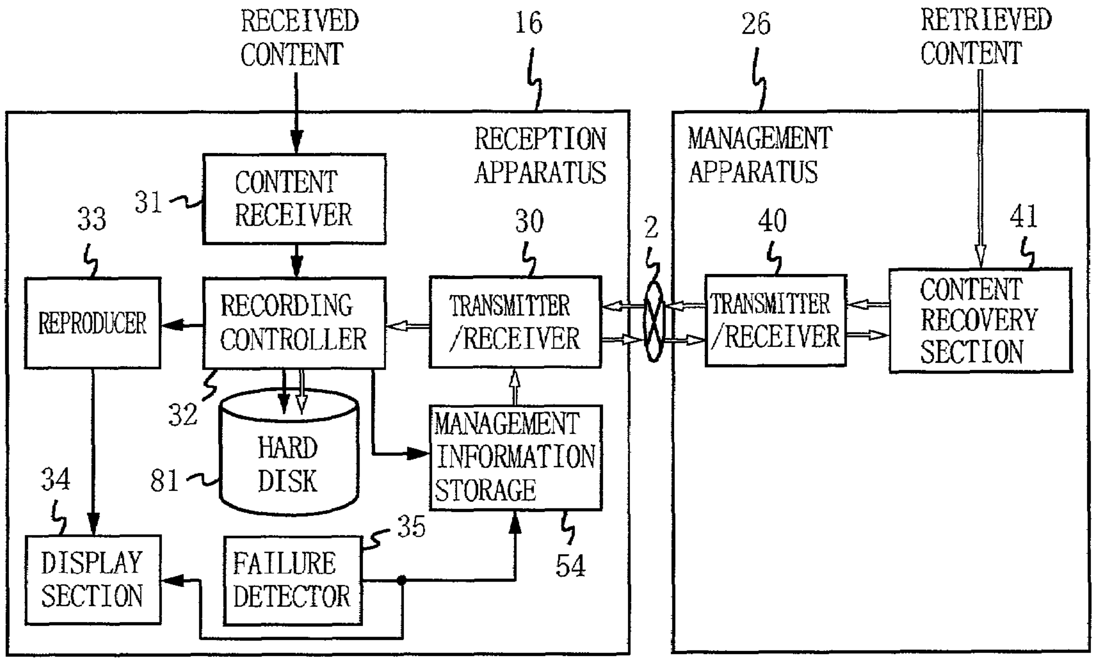
FIG. 12 is a block diagram showing the construction of the content reception system according to the sixth embodiment of the present invention.

FIG. 1 is an illustration showing the construction of a content reception system according to a first embodiment of the present invention. The content distribution system shown in FIG. 1 includes m content distribution apparatuses 1, n reception apparatuses 10, and a management apparatus 20. Of these components, the n reception apparatuses 10 and the management apparatus 20 correspond to the content reception system according to the first embodiment. The n reception apparatuses 10 are respectively placed in users' homes, for example. The management apparatus 20 is located at a place such as a service center. The components shown in FIG. 1 are connected to one another via the Internet 2 so as to bi-laterally communicate with one another.

The content distribution apparatus 1 stores contents such as video data. Upon request from the reception apparatus 10, the content distribution apparatus 1 distributes the stored contents. As with the existing television services, assume herein that a company that manages the content distribution apparatus 1 has a responsibility for content distribution, not for the management of the distributed contents.

The reception apparatus 10 has a hard disk 81 incorporated therein for recording the contents which are distributed from the content distribution apparatus 1. A user of the reception apparatus 10 (hereinafter referred to as a "viewer") reproduces the contents recorded on the hard disk 81 so as to view them. Alternatively, the viewer may view the distributed content and simultaneously record it on the hard disk 81.

The management apparatus 20 is provided for managing an arbitrary number (n in FIG. 1) of reception apparatuses 10. When the hard disk 81 incorporated in any of the n reception apparatuses 10 fails, the management apparatus 20 recovers the contents that are recorded on the faulty hard disk 81. Although only a single management apparatus 20 is illustrated in FIG. 1 for the sake of simplification, note that a plurality of management apparatuses may be provided for managing the n reception apparatuses 10. Hereinafter, a management company that manages the management apparatus 20 is referred to as a "management company".

FIG. 2 is a block diagram showing the construction of the content reception system according to the first embodiment. A reception apparatus 11 and a management apparatus 21 illustrated in FIG. 2 correspond to the reception apparatus 10 and the management apparatus 20 illustrated in FIG. 1, respectively, showing the details of the respective apparatuses. The reception apparatus 11 includes a transmitter/receiver 30, a content receiver 31, a recording controller 32, a hard disk 81, a reproducer 33, a display section 34, and a failure detector 35. The management apparatus 21 includes a transmitter/receiver 40, a content recovery section 41, a recording controller 42, and a management information storage 50.

FIGS. 3 and 4 are illustrations for demonstrating the operation of the content reception system shown in FIG. 2. This content reception system carries out different operations for content reception (FIG. 3) and for hard disk replacement (FIG. 4). In FIG. 3, arrows indicate a flow of data in the content reception. In FIG. 4, hollow arrows indicate a flow of data in the hard disk replacement. Superposing FIG. 3 on FIG. 4 makes FIG. 2.

As shown in FIG. 3, the component mainly operating in the content reception is the reception apparatus 11. The reception apparatus 11 in the content reception receives a content that is distributed by the content distribution apparatus 1, and records the received content on the hard disk 81 via the recording controller 32. The reception apparatus 11 then reproduces the content that is recorded on the hard disk 81 according to the operation by the viewer.

On the other hand, as shown in FIG. 4, the component mainly operating in the hard disk replacement is the management apparatus 21. In the hard disk replacement, the management apparatus 21 has a replacement hard disk 82 attached thereto as a replacement for the hard disk 81 which is incorporated in the reception apparatus 11. The management apparatus 21 recovers the contents that are recorded on the original hard disk 81 of the reception apparatus II, and records the recovered contents on the replacement hard disk 82 attached to the management apparatus 21.

The operations of the reception apparatus 11 and the management apparatus 21 will now be described in detail with reference to FIGS. 3 and 4. The transmitter/receiver 30 and the transmitter/receiver 40 communicate with each other via the Internet 2. The content receiver 31 receives a content that is distributed by the content distribution apparatus 1. The content distribution apparatus 1 may distribute the contents upon request from the reception apparatus 11, or may do so irrespective of whether a request comes from the reception apparatus II. The recording controller 32 records the content that is received by the content receiver 31 on the hard disk 81. The reproducer 33 reads the content that is recorded on the hard disk 81 according to the operation by the viewer for reproduction. The display section 34 displays an image based on the reproduced content.

The content is provided with a use limit. The content receiver 31 receives, from the content distribution apparatus 1, a content and information about the use limit of the received content (hereinafter referred to as "use limit information"). The recording controller 32 records the use limit information together with the received content on the hard disk 81. The reproducer 33 reproduces the content within the limit which is stipulated by the use limit information. The viewer cannot reproduce the content until receiving the use limit information. The reception apparatus 11 may receive the use limit information separately from the content, or may receive the use limit information as being included in the content. In the former case, the use limit information may be distributed by the content distribution apparatus 1 separately to the reception apparatus 11 and to the management apparatus 21.

When recording the received content on the hard disk 81, the recording controller 32 outputs management information, which is described below. The management information includes identification information, source information, and the use limit information for each content that is recorded on the hard disk 81. Examples of the identification information area content name, a URL (Uniform Resource Locator) of the content, and an identification number which is uniquely assigned to each content. The source information represents an apparatus from which the content can be retrieved, and includes information indicating which content distribution apparatus has distributed the content or which reception apparatus has received and stored the content. The use limit information includes the remaining number of use times, expiration date, etc. The management information is used for recovering the content that is recorded on the hard disk 81 of the reception apparatus 11.

The management information that is outputted from the recording controller 32 goes to the transmitter/receiver 30. The transmitter/receiver 30 transmits the received management information to the management apparatus 21. In the management apparatus 21, the transmitter/receiver 40 receives the management information that is transmitted from the reception apparatus 11. The management information that is received by the transmitter/receiver 40 is stored in the management information storage 50. The management apparatus 21 is provided for supporting the n reception apparatuses 10. Therefore, the management information storage 50 stores the management information as to the contents which are recorded on the respective hard disks of the n reception apparatuses 10.

FIGS. 5, 6A, and 6B are illustrations each showing an example of the management information which is stored in the management information storage 50. A table 51 shown in FIG. 5 is an example of the identification information and the use limit information described above, and is composed of items, that is, a reception apparatus 61, a possessed content 62, the remaining number of times the viewer can use the content 63, and an expiration date 64. For example, the second row of the table 51 represents that "the hard disk of the reception apparatus R1 has a movie F2 recorded thereon, and the viewer can use the movie F2 twice more without time limit."

Two tables 52 and 53 shown in FIGS. 6A and 6B, respectively, are examples of the source information described above. The table 52 is composed of items, that is, a content name 65 and a content distribution apparatus 66. The table 53 is composed of items, that is, a content name 65 and a reception apparatus 67. For example, the second row of the table 52 represents that "the movie F2 can be retrieved from a content distribution apparatus S1." Also, for example, the second row of the table 53 represents that "the movie F2 can be retrieved from a reception apparatus R1 or R2." To represent the source information, either one of the tables 52 and 53 may be used, or both may be used.

The recording controller 32 outputs the management information when recording the received content on the hard disk 81. In addition, when the content that is recorded on the hard disk 81 is used, the recording controller 32 outputs a use report indicating that the content is used. The use report that is outputted from the recording controller 32 goes through the transmitter/receiver 30 and the transmitter/receiver 40 to reach the management information storage 50. With this, the management information stored in the management information storage 50 is updated so as to always be the latest (most recent). By way of example only, when the reproducer 33 reproduces a certain content, the recording controller 32 outputs a use report indicating that the content has been used once. Of the management information that is stored in the management information storage 50, the remaining number of times the viewer can use 63 the reproduced content is reduced by one, based on this use report. The recording controller 32 also outputs a similar report if the content has been deleted or if the number of times the viewer can use the content has been changed. Thus, the management information that is stored in the management information storage 50 is updated.

The failure detector 35 detects a failure that occurred on the hard disk 81. The failure detector 35 may detect a failure on the hard disk 81 by using a hardware circuit which is independent of the recording controller 32, or may do so based on a signal which is outputted from the recording controller 32. Furthermore, in addition to the case where the hard disk 81 physically fails, the failure detector 35 may regard the hard disk 81 as having failed also in a case where free space of the hard disk 81 becomes shorter than a predetermined value. The description below is made to both of the above cases.

When detecting a failure on the hard disk 81, the failure detector 35 outputs a failure detection signal to the transmitter/receiver 30 and the display section 34. The display section 34 displays a screen indicating that a failure occurred on the hard disk 81. On the other hand, the failure detection signal that is supplied to the transmitter/receiver 30 goes through the transmitter/receiver 40 to reach a display section (not shown) and the management information storage 50 of the management apparatus 21. Based on the failure detection signal, the display section of the management apparatus 21 displays a screen indicating that a failure occurred on the hard disk 81. Also, the management information storage 50 stores information indicating the same.

When the display section of the management apparatus 21 displays the screen indicating that a failure occurred on the hard disk 81, an operator who operates the management apparatus 21 (hereinafter simply referred to as an "operator") reports to the viewer by phone, e-mail, etc., for confirming whether or not the viewer desires to replace the hard disk 81. Upon receiving the report from the operator, the viewer confirms that the display section 34 is displaying the screen indicating the occurrence of the failure, and requests for replacement of the hard disk 81.

The management apparatus 21 is constructed so as to allow the hard disk 82 to be attached thereto in replacement of the hard disk 81. When the hard disk 81 fails, the operator attaches the replacement hard disk 82 of the same type as that of the hard disk 81 to the management apparatus 21. When the hard disk 81 becomes short of free space, the operator attaches the replacement hard disk 82 having a larger capacity than the hard disk 81 to the management apparatus 21. The operator then uses an input section (not shown) of the management apparatus 21 to specify the hard disk 81 to be replaced. In the management apparatus 21, upon receiving information indicating the specified hard disk to be replaced, the content recovery section 41 starts a content recovery process, which is described below.

FIG. 7 is a flowchart showing the content recovery process which is carried out by the content recovery section 41. The content recovery section 41 first receives, from the operator, the information indicating the specified hard disk to be replaced (step S101). The content recovery section 41 then checks whether or not the specified hard disk actually fails (step S102). Specifically, the content recovery section 41 checks whether the management information that is stored in the management information storage section 50 has information indicating that the specified hard disk fails. If the content recovery section 41 confirms that the specified hard disk fails, the procedure goes to step S103.

The content recovery section 41 then selects, from the management information storage 50, a specific content that is recorded on the hard disk to be replaced, and reads out its content name (step S103). The content recovery section 41 then selects, from the management information storage 50, any apparatus (content distribution apparatus or reception apparatus whose hard disk does not fail) that stores the specific content (step S104). The content recovery section 41 then retrieves the content which is selected in step S103 from the apparatus which is selected in step S104 (step S105). More specifically, the content recovery section 41 is communicably connected to the content distribution apparatus 1 and the other reception apparatuses 10 via the Internet 2, transmitting a content retrieval request to any one of these apparatuses and receiving the content transmitted in response.

The content recovery section 41 then instructs the recording controller 42 to record the content which is retrieved in step S105 on the hard disk 82 as a recovered content (step S106). Following the instruction from the content recovery section 41, the recording controller 42 records the recovered content which is outputted from the content recovery section 41 on the hard disk 82. The content recovery section 41 then checks whether or not all contents have been recovered (step S107). If determining that all contents have been recovered, the content recovery section 41 ends the content recovery process. Otherwise, the procedure returns to step S103.

If, in step S102, the content recovery section 41 cannot find any failure on the specified hard disk, the procedure goes to step S108. In this case, the content recovery section 41 causes the display section of the management apparatus 21 to display a screen indicating an error (step S108), and ends the process.

The operator removes the hard disk 82 having the contents recorded with the content recovery process from the management apparatus 21. Then, the hard disk 82 is brought by an engineer working for the management company (hereinafter simply referred to as "engineer") to the location of the reception apparatus 11. The engineer removes the hard disk 81 to be replaced from the reception apparatus 11, and attaches the hard disk 82 he/she brought to the reception apparatus 11. The engineer then brings the removed hard disk 81 back to the management company.

The hard disk after replacement has the same contents recorded thereon as those having been originally recorded on the replaced hard disk 81. Therefore, the reception apparatus 11 operates similarly as before, even after its hard disk is replaced. Therefore, the viewer can view the same contents as those before the hard disk is replaced, with the same view limitations as before.

As such, according to the content reception system of the first embodiment, the reception apparatus transmits the management information including the identification information of the contents that are recorded on the hard disk. Based on the received management information, the management apparatus recovers the contents. The recovered contents are recorded on a replacement hard disk which is placed in or attached to the management apparatus. The replacement hard disk having the recovered contents recorded thereon takes the place of the hard disk which is incorporated in the reception apparatus. Thus, when the hard disk of the reception apparatus fails, for example, the faulty hard disk can be replaced, and the contents recorded thereon can be easily recovered.

Second Embodiment

FIG. 8 is a block diagram showing the construction of a content reception system according to a second embodiment of the present invention. A feature of the content reception system according to the second embodiment is that the management information is forwarded via a memory card. A reception apparatus 12 of the second embodiment is different from the reception apparatus 11 according to the first embodiment in that the transmitter/receiver 30 is not provided, and a memory card 91 can be attached to the reception apparatus 12. A management apparatus 22 of the second embodiment is different from the management apparatus 21 according to the first embodiment in that the transmitter/receiver 40 is not provided, and the memory card 91 removed from the reception apparatus 12 can be attached to the management apparatus 22 (after being attached to the management apparatus 22, the memory card 91 is referred to herein as a memory card 92). The components similar in construction to those in the first embodiment are provided with the same reference numerals, and are not described herein.

In the reception apparatus 12 in the content reception, the management information that is outputted from the recording controller 32 is recorded on the memory card 91 (refer to arrows in FIG. 8). As with the first embodiment, the management information that is recorded on the memory card 91 is updated so as to always be the latest. For example, when the reproducer 33 reproduces a certain content, the recording controller 32 updates the management information that is recorded on the memory card 91. Otherwise, the reception apparatus 12 operates similarly to the reception apparatus 11 according to the first embodiment. The failure detector 35 detects a failure that occurred on the hard disk 81, and outputs a failure detection signal to the memory card 91 and the display section 34. A screen indicating that a failure occurred on the hard disk 81 is displayed on the display section 34. Information indicating the same is stored on the memory card 91.

Upon recognizing that the display section 34 is displaying the screen indicating the occurrence of the failure, the viewer removes the hard disk 81 and the memory card 91 from the reception apparatus 12, and sends them to the location of the management apparatus 22. The operator of the management apparatus 22 attaches the replacement hard disk 82 of the same type as that of the hard disk 81 (or having a larger capacity) and the received memory card 91 to the management apparatus 22. As with the first embodiment, the operator then specifies the faulty hard disk 81. Then, in the management apparatus 22, as with the first embodiment, the content recovery section 41 carries out the content recovery process shown in FIG. 7. Note that the content recovery section 41 of the second embodiment recovers the contents based on the management information that is recorded on the memory card 92 (refer to hollow arrows in FIG. 8).

The operator removes the hard disk 82 having the contents recorded thereon and the memory card 92 from the management apparatus 22, and returns them to the viewer. The viewer attaches the returned hard disk 82 and the memory card 92 to the reception apparatus 12. The hard disk after replacement has the same contents recorded thereon as those having been recorded on the replaced hard disk 81. Therefore, the reception apparatus 12 operates similarly as before, even after its hard disk is replaced. Therefore, the viewer can view the same contents as those before the hard disk is replaced, with the same view limitations as before.

As such, according to the content reception system of the second embodiment, the management information is recorded on the memory card to be transferred from the reception apparatus to the management apparatus. Thus, when the hard disk of the reception apparatus fails, for example, the faulty hard disk can be replaced, and the contents recorded thereon can be easily recovered. Moreover, the reception apparatus can obtain the recovered contents through physical transportation means, such as by mail, instead of the transmitter/receiver. Therefore, with the memory card previously placed in the reception apparatus, the viewer can enjoy the content recovery service, even if he/she does not sign up for the service in advance, upon payment when the hard disk fails. Further, for BS (Broadcasting Satellite) digital broadcast, a CAS (Conditional Access Systems) card previously included in the reception apparatus can be used as the memory card for the content recovery service. In this case, a new memory card which is dedicated to the content recovery service is not required.

Third Embodiment

FIG. 9 is a block diagram showing the construction of a content reception system according to a third embodiment of the present invention. A feature of the content reception system according to the third embodiment is that the management information is stored in the reception apparatus. A reception apparatus 13 of the third embodiment has the construction of the reception apparatus 11 according to the first embodiment with a management information storage 54 added thereto. A management apparatus 23 of the third embodiment has the construction of the management apparatus 21 according to the first embodiment with the management information storage 50 deleted therefrom. The components which are similar in construction to those in the first embodiment are provided with the same reference numerals, and are not described herein.

In the reception apparatus 13, the management information storage 54 is a storage which is independent of the hard disk 81. Assume herein that, even if the hard disk 81 fails, the failure does not affect the management information storage 54. The management information storage 54 may be a memory card or a hard disk. In the management information storage 54, only the management information as to the reception apparatus 13 is stored.

In the reception apparatus 13 at content reception, the management information that is outputted from the recording controller 32 is stored in the management information storage 54 within the reception apparatus 13 (refer to arrows of FIG. 9). As with the first embodiment, the management information that is stored in the management information storage 54 is updated so as to always be the latest. For example, when the reproducer 33 reproduces a certain content, the recording controller 32 updates the management information that is stored in the management information storage 54. Otherwise, the reception apparatus 13 operates similarly to the reception apparatus 11 according to the first embodiment. The failure detector 35 detects a failure that occurred on the hard disk 81, and outputs a failure detection signal to the management information storage 54 and the display section 34. A screen indicating that a failure occurred on the hard disk 81 is displayed on the display section 34. Information indicating the same is stored in the management information storage 54.

Upon recognizing that the display section 34 is displaying the screen indicating the occurrence of the failure, the viewer removes the hard disk 81 from the reception apparatus 13, and sends the hard disk 81 to the location of the management apparatus 23. The operator of the management apparatus 23 attaches the replacement hard disk 82 of the same type as that of the hard disk 81 (or having a larger capacity) to the management apparatus 23. As with the first embodiment, the operator then specifies the faulty hard disk 81. Then, in the management apparatus 23, as with the first embodiment, the content recovery section 41 carries out the content recovery process shown in FIG. 7. Note that the management information that is stored in the management information storage 54 goes through the transmitter/receiver 30 and the transmitter receiver 40 to reach the content recovery section 41, which recovers the contents based on the received management information (refer to hollow arrows in FIG. 9).

The operator removes the hard disk 82 having the contents recorded thereon from the management apparatus 23, and then returns the hard disk 82 to the viewer. The viewer attaches the returned hard disk 82 to the reception apparatus 13. The hard disk after replacement has the same contents recorded thereon as those having been recorded on the replaced hard disk 81. Therefore, the reception apparatus 13 operates similarly as before, even after its hard disk is replaced. Therefore, the viewer can view the same contents as those before the hard disk is replaced, with the same view limitations as before.

As such, according to the content reception system of the third embodiment, the management information is stored in the reception apparatus, and transmitted at content recovery from the reception apparatus to the management apparatus. Thus, when the hard disk of the reception apparatus fails, for example, the faulty hard disk can be replaced, and the contents recorded thereon can be easily recovered.

Fourth to Sixth Embodiments

FIGS. 10 to 12 are block diagrams respectively showing the constructions of content reception systems according to fourth to sixth embodiments of the present invention. A feature of the content reception systems according to the fourth to sixth embodiments is that a replacement hard disk is placed in the reception apparatus. The fourth, fifth, and sixth embodiments correspond to the first, second, and third embodiments, respectively, with the above-described feature added thereto. The fourth to sixth embodiments are almost similar in construction and operation to one another. Therefore, the sixth embodiment shown in FIG. 12 is hereinafter described as a typical embodiment. The components which are similar in construction to those in the first embodiment are provided with the same reference numerals, and are not described herein.

A reception apparatus 16 of the sixth embodiment includes the same components as those in the reception apparatus 13 according to the third embodiment. A management apparatus 26 of the sixth embodiment includes a transmitter/receiver 40 and a content recovery section 41. At content reception, the reception apparatus 16 operates the same operation as the reception apparatus 13 according to the third embodiment (refer to arrows of FIG. 12). On the other hand, at hard disk replacement, the reception apparatus 16 and the management apparatus 26 operate differently from the reception apparatus 13 and the management apparatus 23 according to the third embodiment (refer to hollow arrows of FIG. 12). The failure detector 35 detects a failure that occurred on the hard disk 81, and outputs a failure detection signal to the management information storage 54 and the display section 34. A screen indicating that a failure occurred on the hard disk 81 is displayed on the display section 34. Information indicating the same is stored in the management information storage 54.

Upon recognizing that the display section 34 is displaying the screen indicating the occurrence of the failure, the viewer removes the hard disk 81 from the reception apparatus 16, and attaches the replacement hard disk of the same type as that of the hard disk 81 (or having a larger capacity) to the reception apparatus 16. The viewer then uses an input section (not shown) to instruct the reception apparatus 16 to carry out the content recovery process. With this instruction, the management information that is stored in the management information storage 54 goes through the transmitter/receiver 30 and the transmitter/receiver 40 to reach the content recovery section 41. The content recovery section 41 recovers the contents based on the received management information, as with the third embodiment. The recovered contents go through the transmitter/receiver 40 and the transmitter/receiver 30 to reach the recording controller 32. The recording controller 32 records the received contents on the hard disk 81.

The replacement hard disk 81 after recording has the same contents recorded thereon as those having been recorded on the replaced hard disk 81. Therefore, the reception apparatus 16 operates similarly as before, even after its hard disk is replaced. Therefore, the viewer can view the same contents as those before the hard disk is replaced, with the same view limitations as before.

According to the content reception system of the sixth embodiment, as with the third embodiment, the management information is stored in the reception apparatus, and is transmitted at content recovery from the reception apparatus to the management apparatus. Thus, when the hard disk of the reception apparatus fails, for example, the faulty hard disk can be replaced, and the contents recorded thereon can be easily recovered. Moreover, since the replacement hard disk is placed in the reception apparatus 16, it is possible to easily recover the contents without hard disk transportation. Similarly, according to the content reception systems of the fourth and fifth embodiments, in addition to the effects of the first and second embodiments, respectively, it is possible to easily recover the contents without hard disk transportation.

Described below are some details of the content reception systems according to the first to sixth embodiments. First, the hard disk 81 of the reception apparatus 10 may be replaced when: (1) the hard disk is broken or out of order; (2) the reception apparatus fails; (3) the viewer purchases a new reception apparatus; (4) the remaining free space of the hard disk 81 becomes limited or inadequate and therefore the viewer desires to move to a large-capacity hard disk; or (5) is so instructed by the viewer, etc. In either case, at hard disk replacement, the contents that are recorded on the hard disk to be replaced have to be recovered and recorded on a replacement hard disk. In this case, until replacement of the hard disk 81 is completed after the hard disk 81 fails, the management apparatus 20 may transmit the recovered contents in a streaming format to the reception apparatus 10. Then, instead of accessing the hard disk 81, the reception apparatus 10 may receive and reproduce the recovered contents. Thus, even if the contents that are recorded on the hard disk cannot be used due to a failure of the hard disk 81, the viewer can receive recovered contents from the management apparatus 20 for reproduction.

Next, to collect fees for operating the content recovery service according to those embodiments, the following two methods can be used. In a first method, fees are collected from the viewers. Each viewer pays a fee to the management company in order to insure the data recorded on the hard disk 81. The viewer may sign up for the content distribution service and the content recovery service at the same time to the management company. Furthermore, the fee for the content recovery service may be automatically transferred from a bank account of the viewer, for example, together with the fee for the content distribution service. Thus, the management company can reliably collect the fees through a company managing the content distribution apparatus 1 without making a fee collection by itself.

In a second method, a fee is collected from a manufacturer of the reception apparatus 10. Failures of the hard disk 81 will hurt the credibility of the manufacturer of the reception apparatus 10. Therefore, the management company collects a predetermined fee from the manufacturer of the reception apparatus 10 for the content recovery service as an after-sales service. In this case, the manufacturer is given a high priority to sell the replacement hard disk 82 when the hard disk 81 is replaced. Thus, it is possible for the manufacturer of the hard disk 81 to have a business chance in demand for hard disk replacement.

Described next is how to recover a content which is allowed to be distributed from the content distribution apparatus 1 only for a predetermined period of time (three days, for example). Such content is hereinafter referred to as "time-limited content". The management apparatus 20 may store the time-limited content therein for recovery. For this purpose, the management apparatus 20 may be provided with a content storage for storing time-limited contents and, based on a contract made between the viewer and the management company, may copy the time-limited contents that are recorded on the reception apparatus 10 into the content storage. Alternatively, the management apparatus 20 may receive the time-limited contents that are distributed from the content distribution apparatus 1 during a period of time allowing reception, and may store the distributed contents in the content storage. As another alternative, at content recovery, the management apparatus 20 may search the n reception apparatuses 10 for any reception apparatus that stores a time-limited content, and retrieve the time-limited content from the found reception apparatus. In this case, the owner of the reception apparatus storing the time-limited content may be given a partial refund of the amount paid.

Next, to prevent the unauthorized use of data that is recorded on the removed hard disk, the following three methods can be used. In a first method, when the received content is recorded on the hard disk 81, an identifier which is unique to the reception apparatus 10 is used as an encryption key for encrypting the content. In a second method, the content that is recorded on the new hard disk is prohibited from being reproduced unless the replaced hard disk 81 is returned within a predetermined period of time (within one week, for example). In a third method, the reception apparatus 10 is constructed such that the hard disk 81 cannot be removed therefrom unless the recorded contents are deleted. For example, pressing an eject button for ejecting the hard disk 81 physically destroys the hard disk 81 or deletes the contents that are recorded on the hard disk 81.

In the first to third embodiments, hard disk replacement of the reception apparatus 10 is carried out by the engineer. Alternatively, this replacement operation may be carried out by the viewer, or repair people from the manufacturer or a rental company of the reception apparatus 10. Nevertheless, the operation should be carried out by the engineer when the operation is technically difficult for the viewer, or when replacement by the viewer is not preferable in view of protecting the copyright of the contents that are recorded on the hard disk 81 and ensuring the capability of the reception apparatus 10.

Furthermore, in the first to third embodiments, the contents that are recorded on the replacement hard disk 82 are the contents that were recorded on the hard disk 81 before replacement. Alternatively, what may be recorded on the replacement hard disk 82 is a program for automatically downloading a required content via the Internet 2 when the replacement hard disk 82 is attached to the reception apparatus 10. As another alternative, only the contents requiring a special procedure, such as contents which are chargeable upon being download and the above-described time-limited contents, may be recorded on the replacement hard disk 82 in the management apparatus 20, and other contents may be downloaded to the reception apparatus 10.

Moreover, in the first to sixth embodiments, distribution of the contents and transmission/reception of the management information are carried out via the Internet 2. Alternatively, distribution of the contents may be carried out via another communications network, such as a cable television network or a satellite broadcast network. Also, the transmission/reception of the management information may be carried out via another communications network, such as a cell phone network or a dedicated network. In addition, the hard disk and the memory card may be transported by any arbitrary means so as long as the data contained therein can be ensured.

While the present invention has been described in detail, the foregoing description is in all aspects illustrative and not restrictive. It is to be understood that numerous other modifications and variations can be devised without departing from the scope of the present invention.

What is claimed is:

1. A data reception system comprising a reception apparatus and a management apparatus for managing said reception apparatus, wherein:

said reception apparatus comprises a data receiver operable to receive data from a data source, a recording medium operable to record the data received by said data receiver, a recording controller operable to control access to said recording medium, and a management information output unit operable to output management information including identification information about the data recorded on said recording medium;

said management apparatus comprises a management information input unit operable to input the management information, and a data recovery unit operable to, when said recording medium is replaced, recover the data recorded on said recording medium before said recording medium was replaced as recovered data based on the management information inputted by said management information input unit;

said reception apparatus and said management apparatus are coupled to each other via a communication line;

said management apparatus is constructed so as to enable said recording medium to be removably attached thereto; and said management apparatus further comprises a second recording controller operable to, when said recording medium is replaced, record the recovered data on a replacement recording medium attached to said management apparatus.

2. A data reception system comprising a reception apparatus and a management apparatus for managing said reception apparatus, wherein:

said reception apparatus comprises a data receiver operable to receive data from a data source, a recording medium operable to record the data received by said data receiver, a recording controller operable to control access to said recording medium, and a management information output unit operable to output management information including identification information about the data recorded on said recording medium;

said management apparatus comprises a management information input unit operable to input the management information, and a data recovery unit operable to, when said recording medium is replaced, recover the data recorded on said recording medium before said recording medium was replaced as recovered data based on the management information inputted by said management information input unit;

said reception apparatus and said management apparatus are coupled to each other via a communication line;

said management apparatus is constructed so as to enable said recording medium to be removably attached thereto;

said management apparatus further comprises a second recording controller operable to, when said recording medium is replaced, record a program for receiving the recovered data on a replacement recording medium attached to said management apparatus, and a recovered data transmission unit operable to transmit the recovered data;

said reception apparatus further comprises a recovered data receiver operable to, when said recording medium is replaced, receive the recovered data by reading the program from said replacement recording medium removed from said management apparatus and then attached to said reception apparatus, and by using the read program; and said recording controller is operable to record the recovered data received by said recovered data receiver on said replacement recording medium when said recording medium is replaced.

3. A data reception system comprising a reception apparatus and a management apparatus for managing said reception apparatus, wherein:

said reception apparatus comprises a data receiver operable to receive data from a data source, a recording medium operable to record the data received by said data receiver, a recording controller operable to control access to said recording medium, and a management information output unit operable to output management information including identification information about the data recorded on said recording medium;

said management apparatus comprises a management information input unit operable to input the management information, and a data recovery unit operable to, when said recording medium is replaced, recover the data recorded on said recording medium before said recording medium was replaced as recovered data based on the management information inputted by said management information input unit;

said reception apparatus and said management apparatus are coupled to each other via a communication line;

said reception apparatus and said management apparatus are both constructed so as to enable a second recording medium which is different from said recording medium to be removably attached thereto;

said management information output unit is operable to record the management information on the second recording medium attached to said reception apparatus; and said management information input unit is operable to, when said recording medium is replaced, read the management information from said second recording medium removed from said reception apparatus and then attached to said management apparatus, and to output the read management information to said data recovery unit.

4. The data reception system according to claim 3, wherein said management information output unit is operable to record, on said second recording medium, use limit information of the data recorded on said recording medium as being included in the management information, and, when the data recorded on said recording medium is used, to update the use limit information of the data recorded on said second recording medium.

5. A data reception system comprising a reception apparatus and a management apparatus for managing said reception apparatus, wherein:

said reception apparatus comprises a data receiver operable to receive data from a data source, a recording medium operable to record the data received by said data receiver, a recording controller operable to control access to said recording medium, and a management information output unit operable to output management information including identification information about the data recorded on said recording medium;

said management apparatus comprises a management information input unit operable to input the management information, and a data recovery unit operable to, when said recording medium is replaced, recover the data recorded on said recording medium before said recording medium was replaced as recovered data based on the management information inputted by said management information input unit;

said reception apparatus and said management apparatus are coupled to each other via a communication line;

said management information output unit is operable to store, in said management information output unit, the management information, and, when said recording medium is replaced, to transmit the stored management information to said management apparatus; and said management information input unit is operable to, when said recording medium is replaced, receive the management information from said reception apparatus, and to output the received management information to said data recovery unit.

6. The data reception system according to claim 5, wherein said management information output unit is operable to store, in said management information output unit, use limit information of the data recorded on said recording medium as being included in the management information, and, when the data recorded on said recording medium is used, to update the stored use limit information included in the management information.

7. A data reception system comprising a reception apparatus and a management apparatus for managing said reception apparatus, wherein:

said reception apparatus comprises a data receiver operable to receive data from a data source, a recording medium operable to record the data received by said data receiver, a recording controller operable to control access to said recording medium, a management information output unit operable to output management information including identification information about the data recorded on said recording medium, and a decision unit operable to decide whether or not said recording medium should be replaced;

said management apparatus comprises a management information input unit operable to input the management information, and a data recovery unit operable to, when said recording medium is replaced, recover the data recorded on said recording medium before said recording medium was replaced as recovered data based on the management information inputted by said management information input unit;

said reception apparatus and said management apparatus are coupled to each other via a communication line;

when said decision unit decides that said recording medium should be replaced, said recording controller is operable to receive the recovery data from said management apparatus instead of accessing said recording medium until replacement of said recording medium is completed.

8. A data reception system comprising a reception apparatus and a management apparatus for managing said reception apparatus, wherein:

said reception apparatus comprises a data receiver operable to receive data from a data source, a recording medium operable to record the data received by said data receiver, a recording controller operable to control access to said recording medium, and a management information output unit operable to output management information including identification information about the data recorded on said recording medium;

said management apparatus comprises a management information input unit operable to input the management information, and a data recovery unit operable to, when said recording medium is replaced, recover the data recorded on said recording medium before said recording medium was replaced as recovered data based on the management information inputted by said management information input unit;

said reception apparatus and said management apparatus are coupled to each other via a communication line; and after a predetermined time elapses from the time of recovery, the recovered data can be used only when a condition for returning said recording medium is satisfied.

* * * * *